July 1, 1924.

F. R. KLAUS ET AL 1,499,739

AUTOMOBILE WHEEL RIM

Filed Feb. 23, 1921

Inventors.
Fred R. Klaus
Harry W. Kranz.

By Lloyd L. Evans
Attorney

Patented July 1, 1924.

1,499,739

UNITED STATES PATENT OFFICE.

FRED R. KLAUS AND HARRY W. KRANZ, OF CLEVELAND, OHIO, ASSIGNORS TO THE HYDRAULIC STEEL COMPANY, OF CLEVELAND, OHIO, A CORPORATION OF OHIO.

AUTOMOBILE WHEEL RIM.

Application filed February 23, 1921. Serial No. 447,136.

*To all whom it may concern:*

Be it known that we, FRED R. KLAUS and HARRY W. KRANZ, citizens of the United States, residing at Cleveland, in the county of Cuyahoga and State of Ohio, have invented a certain new and useful Improvement in Automobile Wheel Rims, of which the following is a full, clear, and exact description, reference being had to the accompanying drawings.

This invention relates to automobile wheel rims of the type in which one of the tire retaining flanges comprises a removable ring.

The object of the present invention is to provide a rim having an easily detachable ring adapted to be held in place by engagement with the inside of the tire bead, making it unnecessary to provide special fastening means for securing the ends of the ring together at the split, though these may be used if desired.

It is also an object of this invention to construct the edge of the main rim section to receive such a locking ring and at the same time make this portion of the main rim section as rigid as possible to insure against distortion thereof, either by tire pressure or by impact against external objects while in use.

It is also an object of this invention to provide a rim in which the tire shoe can be quickly and easily applied to and removed from the rim.

In the drawings forming a part of this specification,

Figure 1:
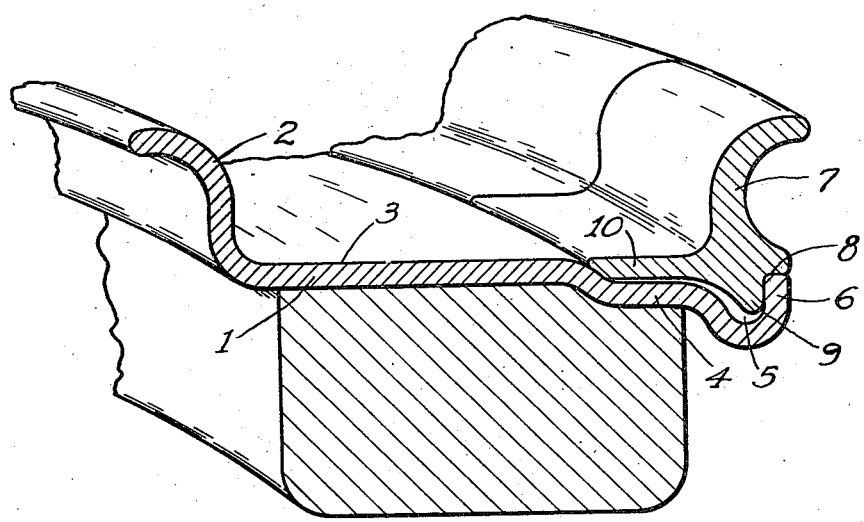
Figure 1 is a transverse section through the rim showing the rim upon a conventional wooden wheel.
Figure 2:
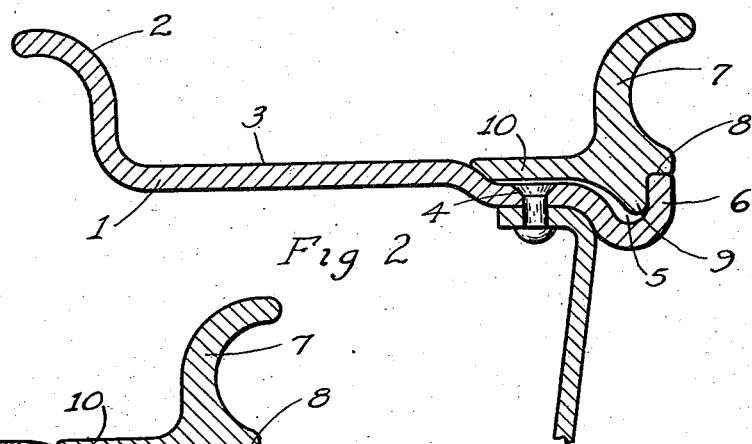
Fig. 2 is a sectional view showing the same rim upon a disk wheel.
Figure 3:
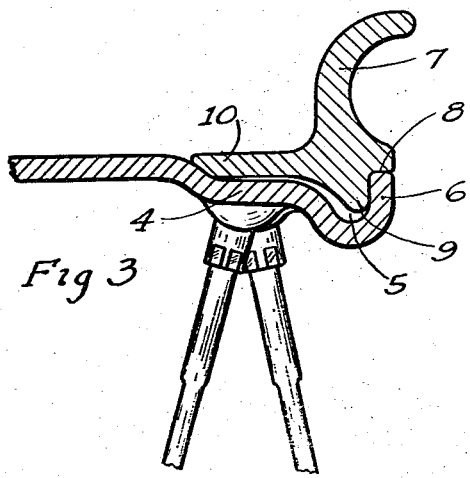
Fig. 3 is a sectional view showing the rim used in a wire wheel.

The main rim section 1 has an integral tire retaining flange 2 and a base portion 3 having an offset portion 4 at its outer edge. The offset portion 4 is bent inwardly and flanged at the edge to form a relatively narrow groove 5 for retaining the split locking ring 7 in position. The split ring 7 is resiliently contractile and is removable to permit the application of the tire shoe to the rim and its removal therefrom. The flange 6 at the outer edge of the base portion is substantially flush with the upper surface of the offset portion inside the groove.

The tire retaining ring 7 has a shoulder 8 engaging the upper edge of the flange 6 and a depending lip 9 extending into the groove and engaging the inner face of the flange. The ring 7 has also an inwardly extending flange 10 resting upon the offset portion 4 and of such thickness that its outer face is substantially flush with the outer face of the base portion 3.

The above described rim is cheap to manufacture and possesses maximum strength by reason of the fact that there are no sharp bends therein to render difficult the rolling thereof or set up undue stresses at any point therein.

The ring 7 is easily removable after the tire has been deflated to the proper extent by prying up one end near the split so that the lip 9 is elevated over the flange 6. The ring being wide, that is—having the inwardly extending flange 10, facilitates the leverage which the operator can exert to remove the ring from the groove and free it from the tire. After the ring 7 has been removed, the tire bead is easily removable as the flange 6 and offset portion 4 are both below the level of the base of the rim.

By reason of the grooved offset construction, the rim at the edge beneath the removable ring is more rigid against lateral distortion inwardly by impact against external objects such as a curb, than where the groove drops directly from the base, since the inner wall of the groove is shorter.

Making the groove to substantially fit the inner contour of the locking ring 7 decreases the liability of dirt and water working in through the groove to the tire.

The offset portion 4 has the advantage that the ring 7 does not need to fit accurately. If the flange 10 should be a little short or should the flange 6 be bent outward slightly the flange 10 will seat on the offset portion and not be pressed inwardly sufficiently by the tire to cause damage thereto.

Having described our invention, what we claim is:

In a wheel, a tire retaining rim having a fixed section, comprising a circumferential tire retaining flange and a base portion integral therewith having a portion forming a seat for a portion of the base of the tire, said base portion being offset to a smaller diameter on the side thereof opposite said integral flange, said offset portion at its outer edge being bent inwardly and flanged outwardly to form a relatively narrow peripheral groove therein, and a removable tire retaining ring having a circumferential tire retaining flange, an intermediate lip projecting inwardly from the base thereof engaging said peripheral groove and forming with the outer portion of the base thereof a shoulder engaging the edge of the flange at the outer side of the groove and an inwardly projecting flange extending across said offset portion, the top thereof being alined with the base portion of the fixed section and completing the seat for the tire base.

In testimony whereof, we hereunto affix our signatures.

FRED R. KLAUS.
HARRY W. KRANZ.